United States Patent
McNamee et al.

(10) Patent No.: US 8,276,468 B2
(45) Date of Patent: Oct. 2, 2012

(54) PIEZOELECTRIC SENSORS FOR AUTOMATIC MEASUREMENT OF NIP WIDTH FOR FUSER MEMBER CONTROL

(75) Inventors: Brian John McNamee, Brockport, NY (US); David B. Montfort, Webster, NY (US); Jerry F. Adams, Waterport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/008,264

(22) Filed: Jan. 18, 2011

(65) Prior Publication Data

US 2012/0180573 A1    Jul. 19, 2012

(51) Int. Cl.
*G01L 1/00*    (2006.01)
(52) U.S. Cl. .................................... 73/862.68
(58) Field of Classification Search ............ 73/862.68, 73/862.55
See application file for complete search history.

(56) References Cited

U.S. PATENT DOCUMENTS

| | | | |
|---|---|---|---|
| 3,760,637 A * | 9/1973 | Budinger et al. | 73/862.55 |
| 4,016,756 A | 4/1977 | Kunkle | |
| 5,048,353 A | 9/1991 | Justus | |
| 5,379,652 A | 1/1995 | Allenen | |
| 5,383,371 A | 1/1995 | Laitinen | |
| 6,201,938 B1 | 3/2001 | Holler et al. | |
| 6,568,285 B1 | 5/2003 | Moore et al. | |
| 6,752,908 B2 | 6/2004 | Gustaffson et al. | |
| 6,769,314 B2 | 8/2004 | Moore et al. | |
| 2005/0098289 A1 | 5/2005 | Pitkanen et al. | |
| 2010/0071480 A1 * | 3/2010 | Pietikainen et al. | 73/862.55 |

* cited by examiner

*Primary Examiner* — Lisa Caputo
*Assistant Examiner* — Octavia Davis-Hollington
(74) *Attorney, Agent, or Firm* — Ronald E. Prass, Jr.; Prass LLP

(57) ABSTRACT

According to aspects of the embodiments, an apparatus and method is proposed to detect nip width by use of at least one piezoelectric (PZT) crystal embedded into a roll at both the inboard and outboard ends. A piezoelectric (PZT) crystal generates a charge when subjected to a load and when the load is released. The PZT generate signal is channeled to the ends of the roller such as with a brush contact to be processed and used within machine control. The duration measure from application and released of the load is indicative of the dwell time and the amplitude PZT generate signal is a function of the pressure. The time and amplitude of the PZT signal can be calibrated to correlate directly to nip width or pressure and tracked in machine control.

14 Claims, 6 Drawing Sheets

PIEZOELECTRIC SENSORS FOR AUTOMATIC MEASUREMENT OF NIP WIDTH FOR FUSER MEMBER CONTROL

BACKGROUND

This disclosure relates in general to measurement of nip force in a nip formed by a pair of rollers in a printing system, and, in particular to an apparatus and method which are capable of determining the nip width distribution between nipped rollers.

The nip width is the measured arc distance created by the intersection of a soft fuser roll and a hard pressure roll (nipped rolls) in an image production device, such as a printer, copier, multi-function device, and the like, which enables heat transfer and pressure needed to fuse prints. Nipped rolls are used in a vast number of continuous process industries including papermaking, steel making, plastics calendaring and printing. In the printing space, variation of the nip width from optimal conditions can cause toner to be improperly melted and pressed (fused) against the print media resulting in image quality defects. In addition, improper nip setting can result in excessive wear of the fuser roll surface which results in image quality defects in the form of areas containing unacceptable differential gloss.

An accurate and consistent nip width increases fuser roll life by helping to minimize edge wear on the roll. It has been shown that uneven and excessive nip settings, inboard to outboard, result in accelerated edge wear. The nip width is supposed to be checked and adjusted with every fuser roll replacement. This measurement is not always done and combined with roll Durometer varying significantly from batch to batch, the roll nip widths are frequently incorrectly set. In addition, as the fuser roll ages the softness of the rubber changes resulting in less-than-optimum nip widths.

Methods have been used to discover discrepancies in nip width as a function of applied pressure. One such method known as taking a nip impression requires stopping the roll and placing a long piece of carbon paper, prescale film, foil, or impressionable film in the nip. This requires the operator to load the rolls carefully to ensure that both sides, that being front and back, are loaded evenly. The pressure in the nip transfers a carbon impression, deforms the foil, or ruptures ink containing capsules in the film, indicating the width of contact. These methods offer only a single event such as the highest pressure or contact width, are susceptible to temperature and moisture variations, and if done at every print would negatively impact the printing process.

For the reasons stated above, and for other reasons stated below which will become apparent to those skilled in the art upon reading and understanding the present specification there is need in the art for apparatus, and/or methods that can dynamically measure nip width.

SUMMARY

According to aspects of the embodiments, an apparatus and method is proposed to detect nip width by use of at least one piezoelectric (PZT) crystal embedded into a roll at both the inboard and outboard ends. A piezoelectric (PZT) crystal generates a charge when subjected to a load and when the load is released. The PZT generate signal is channeled to the ends of the roller such as with a brush contact to be processed and used within machine control. The duration measure from application and released of the load is indicative of the dwell time and the amplitude PZT generate signal is a function of the pressure. The time and amplitude of the PZT signal can be calibrated to correlate directly to nip width or pressure and tracked in machine control.

DETAILED DESCRIPTION

Figure 1:
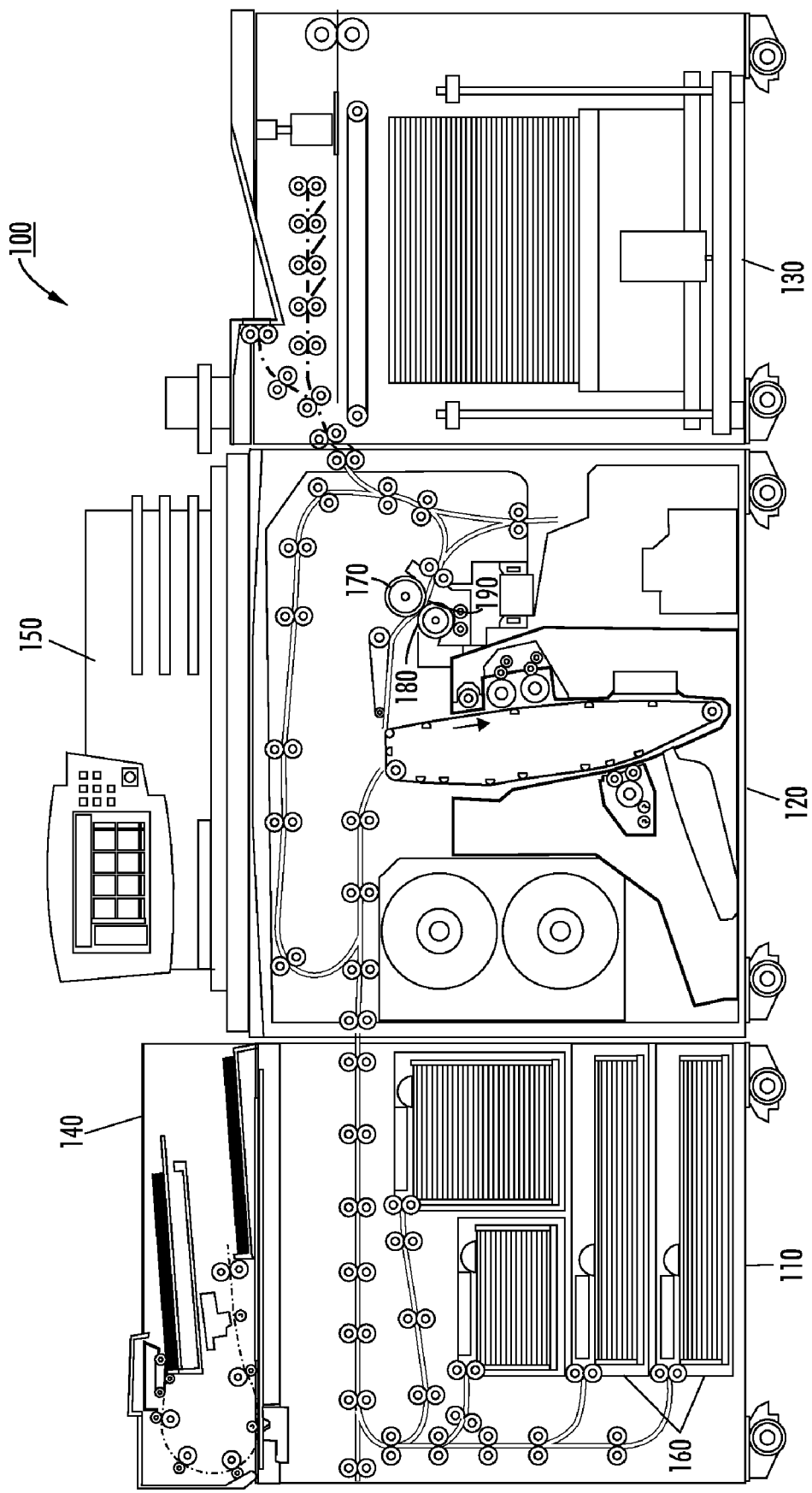
FIG. 1 is an exemplary diagram of an image production device in accordance with one possible embodiment of the disclosure.

Aspects of the embodiments disclosed herein relate to methods and corresponding apparatus to measure nip width between a pair of nipped rolls. While the present invention will be described below in connection with respect to a fusing nip in the exemplary electrostatographic machine and as a particular preferred embodiment thereof, it will be understood that it is not intended to limit the invention to just that use or just that embodiment. On the contrary, it is intended to cover all alternatives, modifications, and equivalents as may be included within the spirit and scope of the invention as defined by the appended claims.

The disclosed embodiments include an apparatus useful to detect nip width defined between rolls in a printing system, the apparatus comprising a first roller having an axis of rotation and a surface; a second roller having an axis of rotation that is substantially parallel to the axis of rotation of the first roller, the second roller disposed so that a surface of the second roller exerts pressure on the surface of the first roller at a nip having a width; at least one sensor disposed at the second roller to generate an electrical signal upon the start of the nip and at upon the end of the nip; and a circuit to receive the electrical signal generated by the at least one sensor so as to produce timing pulses and a magnitude signal indicative of the exerted pressure on the surface of the first roller.

The disclosed embodiments further include an apparatus wherein the at least one sensor is disposed at the end of the second roller and selected from a group consisting of load cell, piezoelectric crystal and combination thereof.

The disclosed embodiments further include an apparatus wherein the electrical signal generated by the at least one sensor is passed to the circuit by at least one of signal transmitter, communication cable.

The disclosed embodiments further include an apparatus wherein the communication cable is a cable coupled to a ring style connector.

The disclosed embodiments further include an apparatus wherein the communication cable is a stationary contact with spring loaded brush.

The disclosed embodiments further include an apparatus wherein the electrical signal from the at least one sensor is produced at the start of the nip and upon the end of the nip.

The disclosed embodiments further include processing logic to determine at least one of nip width and dwell time from the timing pulses.

The disclosed embodiments further include an apparatus wherein the circuit to receive the electrical signal generated by the at least one sensor comprises an inverting amplifier and integrator amplifier.

The disclosed embodiments include a method to detect nip width defined between a first roller having an axis of rotation and a surface and a second roller having an axis of rotation that is substantially parallel to the axis of rotation of the first roller in a printing system, the method comprising arranging at least one sensor at the second roller to generate an electrical signal upon the start of the nip and at upon the end of the nip; processing with a circuit the electrical signal generated by the at least one sensor so as to produce timing pulses and a magnitude signal indicative of an exerted pressure caused by the second roller on the surface of the first roller; and determining at least one of nip width and dwell time from the timing pulses.

The disclosed embodiments include an apparatus comprising a media transport configured to transport a media sheet; a fuser member coupled to the media transport, the fuser member having a fuser nip configured to fuse an image on media; at least one sensor disposed at the fuser member to generate an electrical signal upon the start of the fuser nip and at upon the end of the fuser nip; a circuit to receive the electrical signal generated by the at least one sensor so as to produce timing pulses and a magnitude signal indicative of an exerted pressure during the fuse of an image on media; and a controller coupled to the circuit to receive the electrical signal and coupled to the fuser member, the controller configured to adjust a fuser member nip width according to the timing pulses and the magnitude signal.

As used herein, the term "print media" generally refers to a usually flexible, sometimes curled, physical sheet of paper, plastic, or other suitable physical print media substrate for images, whether precut or web fed.

As used herein, the term "rotatable member" generally refers to a roller or roll which as used herein are interchangeable, a belt, or a rolling element adapted for rotation about an axis, or a combination thereof.

As used herein, the term "printing system" encompasses any apparatus, such as a digital copier, bookmaking machine, ionographic system, electrophotographic system, multi-function machine, and the like, that can perform a print outputting function for any purpose.

The term "electrophotographic system" is intended to encompass image reproduction machines, xerographic system, electrophotographic printers and copiers that employ dry toner developed on an electrophotographic receiver element.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a feeder section 110, which stores and dispenses sheets on which images are to be printed, and an output section 130, which may include hardware for stacking, folding, stapling, binding, fuser, other devices necessary for the printing process, prints which are output from the marking engine. If the printer is also operable as a copier, the printer further includes a document feeder 140, which operates to convert signals from light reflected from original hard-copy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the module may include any number of trays, each of which may store a print media stack 160 or print sheets ("media") of a predetermined type (size, weight, color, coating, transparency, etc.) and includes a feeder to dispense one of the sheets therein as instructed. Certain types of media may require special handling in order to be dispensed properly. For example, heavier or larger media may desirably be drawn from a print media stack 160 by use of an air knife, fluffer, vacuum grip or other application (not shown) of air pressure toward the top sheet or sheets in a print media stack. Certain types of coated media are advantageously drawn from a media stack 160 by the use of an application of heat, such as by a stream of hot air (not shown). Sheets of media drawn from a print media stack 160 on a selected tray 110 may then be moved to the image production section 120 to receive one or more images thereon.

In this embodiment, the image production section 120 is shown to be a monochrome xerographic type engine, although other types of engines, such as color xerographic, ionographic, or ink-jet may be used. In FIG. 1, the image production section 120 may include a photoreceptor which may be in the form of a rotatable belt. The photoreceptor may be called a "rotatable image receptor," meaning any rotatable structure such as a drum or belt which can temporarily retain one or more images for printing. Such an image receptor can comprise, by way of example and not limitation, a photoreceptor, or an intermediate member for retaining one or more marking material layers for subsequent transfer to a sheet, such as in a color xerographic, offset, or ink-jet printing apparatus.

The photoreceptor may be entrained on a number of rollers, and a number of stations familiar in the art of xerography are placed suitably around the photoreceptor, such as a charging station, imaging station, development station, and transfer station. In this embodiment, the imaging station is in the form of a laser-based raster output scanner, of a design familiar in the art of "laser printing," in which a narrow laser beam scans successive scan lines oriented perpendicular to the process direction of the rotating photoreceptor. The laser may be turned on and off to selectably discharge small areas on the moving photoreceptor according to image data to yield an electrostatic latent image, which is developed with marking material at development station and transferred to a sheet at transfer station.

A sheet having received an image in this way is subsequently moved through fuser section that may include a fuser roll 170 and a pressure roll 180, of a general design known in the art, and the heat and pressure from the fuser roll 170 causes the marking material image to become substantially permanent on the sheet. The nip width 190 is the distance along the arc of the pressure roll 180 surface that is in contact with the surface of the fuser roll 170. The nip width 190 is a critical parameter which has an impact on image quality and the use of resources. The disclosed embodiment uses a piezoelectric crystal, shown in FIG. 2, as a means to detect nip width. Piezoelectric crystals generate charge when subjected to a load and are durable in cyclic stress. A small PZT crystal embedded into pressure roll 180 at both the inboard and outboard ends, outside the paper path would be subjected to the pressure of the contact arc for each revolution of the roller. The sheet once printed, may then be moved to output section 130, where it may be collated, stapled, folded, etc., with other media sheets in a manner familiar in the art.

While the present invention will be described below in connection with respect to rollers in the exemplary printing system and as a particular preferred embodiment thereof, it will be understood that it is not intended to limit the invention to just that use or just that embodiment. On the contrary, it is intended to cover rollers, belts, rotatable members or a combination thereof.

Figure 2:
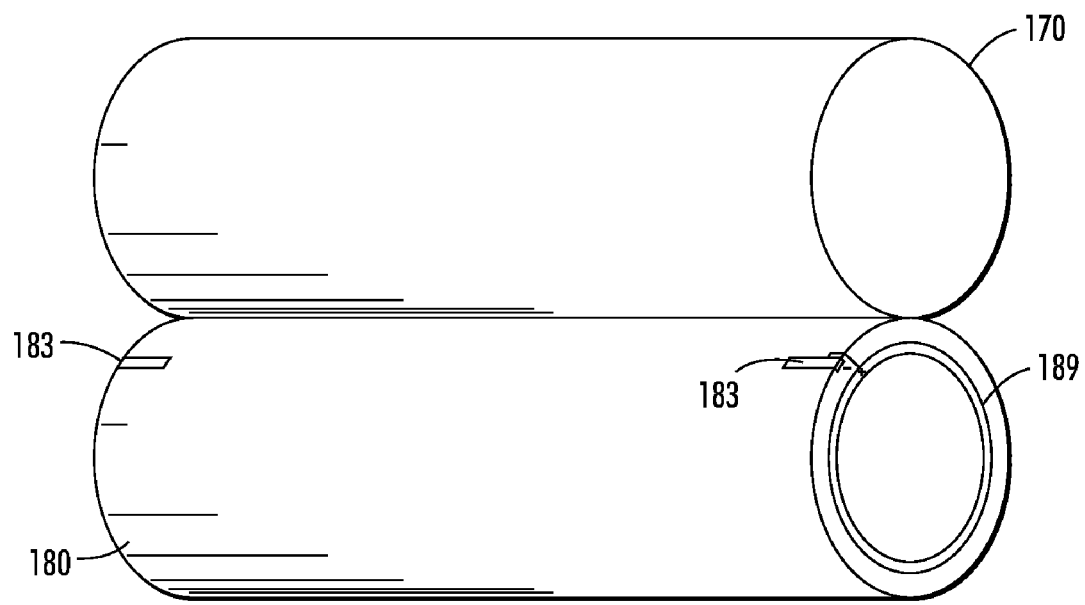
FIG. 2 illustrates a pair of nipped rollers with PZT crystals in accordance to an embodiment.
Figure 6:
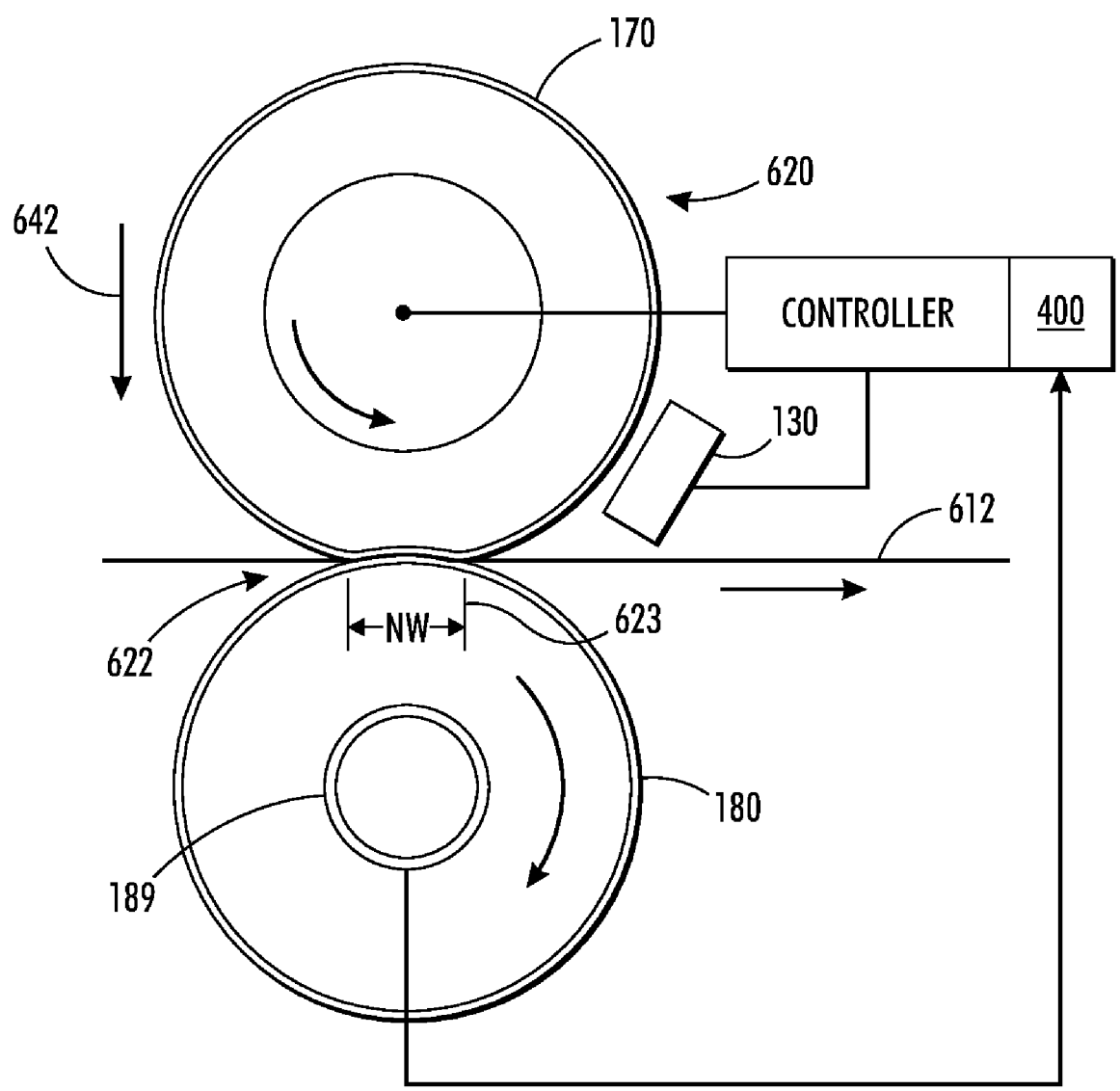
FIG. 6 illustrates a side view of an apparatus for dynamically adjusting nip width in accordance to an embodiment.

FIG. 2 illustrates a pair of nipped rollers with PZT crystals in accordance to an embodiment. To measure the pressure exerted by the rollers at least one sensor is disposed at the end of the pressure roll 180 and selected from a group consisting of load cell, piezoelectric crystal and combination thereof. The pressure roll 180 is disposed so that a surface of the pressure roll exerts a load or pressure on the surface of the fuser roll at a nip having a width. The piezoelectric crystals (183, 186) such as PZT ceramic are embedded in the pressure roll 180 at both ends, making electrical contact through a ring-brush connector 189. The inboard and outboard sensors (183, 186) would be calibrated in manufacturing to normalize their output gain via a standardized loading routine that assigns each sensor a unique non-volatile memory (NVM) value in a storage device such as ROM 240 in FIG. 4. These NVM values would be loaded into software for post processing. Should a recalibration of the sensors be warranted in the field, a standard load could be applied to the sensor 183 or 186 then the look-up table values are adjusted based on the output voltage of the sensor. The information obtained from the inboard and outboard signals could be used for a closed loop feedback to a mechanism to readjust inboard and/or outboard contact force as shown in FIG. 6. The information could also be logged for on-site or off-site monitoring through network connection or other communication means. While the illustration shows Xerographic fusing, the nip width monitoring technique is well suited for any application where rotational contact nip parameters are critical to function.

Although the above description is directed toward a fuser used in xerographic printing, it will be understood that the teachings and claims herein can be applied to any treatment of marking material on a medium. For example, the marking material may comprise liquid or gel ink, and/or heat- or radiation-curable ink; and/or the medium itself may have certain requirements, such as temperature, for successful printing. The heat, pressure and other conditions required for treatment of the ink on the medium in a given embodiment may be different from those suitable for xerographic fusing.

Figure 3:
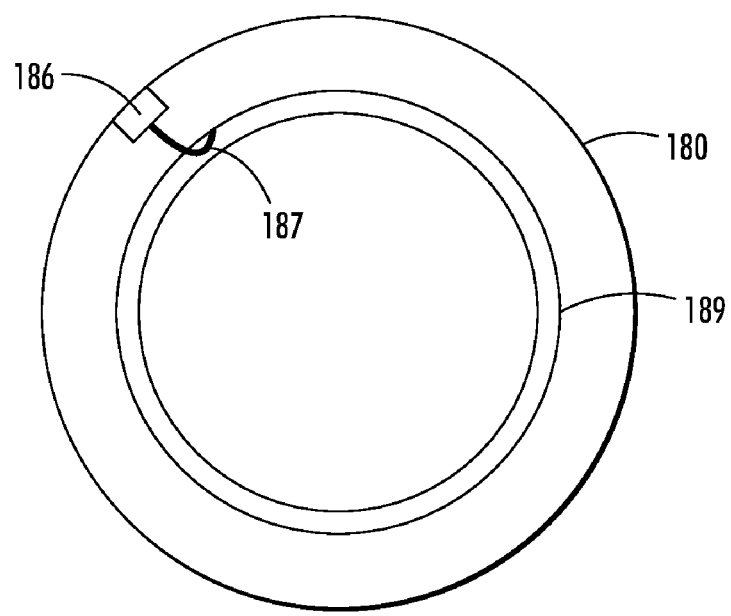
FIG. 3 illustrates a load sensing PZT crystal coupled to a ring connector in accordance to an embodiment.

FIG. 3 illustrates a load sensing PZT crystal coupled to a ring connector in accordance to an embodiment. The sensor 186 such as a PZT crystal emits an electrical signal that is communicated through a cable 187 to ring connector 189. As the pressure roller 180 rotates the cable 187 rotates in the same direction while it stays coupled to ring connector 189. In the preferred embodiment, the positive electrode of sensor 186 such as from a PZT crystal is attached to rotating ring style connector 189. In the alternative, cable 187 is stationary contact and makes contact to sensor 186 through spring loaded brush. While the negative electrode is grounded through conductive adherence to metal roll or through a separate grounding cable.

Figure 4:
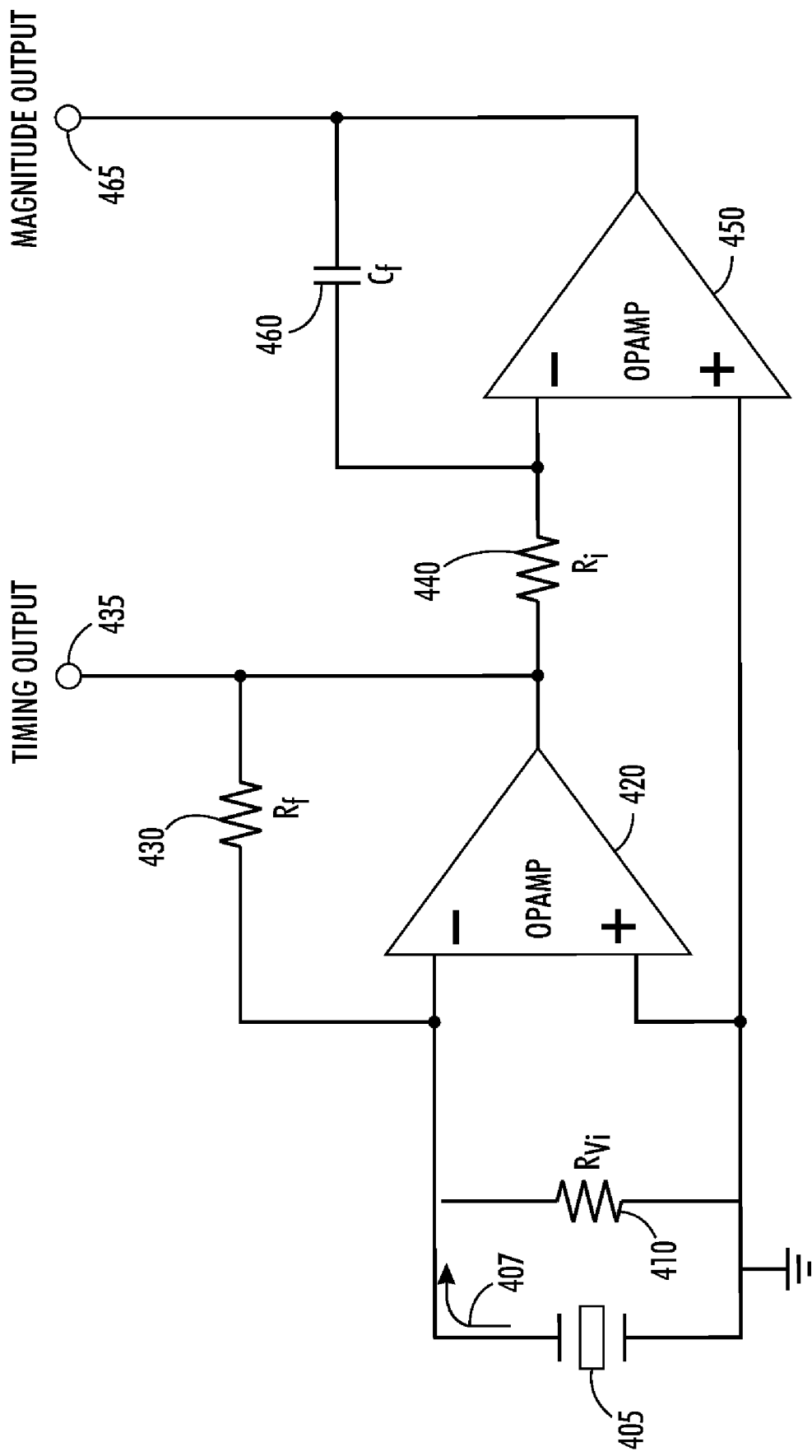
FIG. 4 illustrates a circuit for performing signal conditioning on the piezoelectric nip sensor (PZT signal) to generate timing signals and magnitude signal in accordance to an embodiment.

FIG. 4 illustrates a circuit 400 for performing signal conditioning on the piezoelectric nip sensor (PZT signal) to generate timing signals and magnitude signal in accordance to an embodiment. A technical effect of the circuit is to process the electrical signals of one or more sensors that are sensitive to mechanical pressure associated with a nip. Although specific embodiments are illustrated and described herein, it will be appreciated by those of ordinary skill in the art that any arrangement which is calculated to achieve the same purpose may be substituted for the specific embodiments shown. This application is intended to cover any adaptations or variations. For example, although described in hardware terms, one of ordinary skill in the art will appreciate that implementations can be made in software or with hardware having embedded software that provides the required function.

Circuit 400 performs signal conditioning on the electrical signal generated by a sensor such piezoelectric nip sensor 405. The crystal will generate a positive current 407 when it is compressed. While it is compressed it won't generate any current or a current that is substantially zero. When it is relaxed or decompressed it will generate a negative current. And while it remains relaxed it won't generate any current. When a second PZT crystal such as sensor 183 a second conditioning circuit is used. In addition to providing load sensing reliability another advantage of a second sensor is acquiring an indication of misalignment of the rolls. The voltages out of the respective sensors can be compared to determined misalignment. The generated current 407 produces a voltage across resistor 410 (RVI).

The first opamp stage 420 converts the crystal current 407 to a voltage 435 (timing output) that can be used to time the dwell time. The dwell time and the process speed together determine the nip width as it is well known to those in the art. A timer at the circuit or at external processing device like controller 400 would be started on the positive current pulse as the PZT crystal is compressed and stopped on the negative current pulse as the PZT crystal is relaxed. These electrical signals are produced at the start of the nip and upon the end of the nip. In this configuration the operational amplifier is connected with feedback to produce a closed loop operation through resistor (RR) 430.

The second opamp stage 450 is an integrator. The integrator amplifier performs the mathematical operation of integration, that is the output responds to changes in the input voltage 437 over time and the integrator amplifier produces a voltage output 452 which is proportional to that of its input voltage 437 with respect to time. In other words the magnitude of the output signal is determined by the length of time a voltage is present at its input as the current through the feedback loop charges or discharges the capacitor (CI) 460. The output voltage is proportional to the integral of the input voltage and scaled (1/RiCf) based on the feedback capacitor 460 and input resistor 440. The integrator stage would indicate the area under the current pulse and would be analogous to the compression force applied to the crystal. This would be valid between the positive and negative current pulses.

A low pass filter could be used to filter out external vibration signals, but this is not necessary since the second opamp stage 450 (integrator) is by definition a low pass filter. A high pass filter could be used to strip off any thermoelectric voltage generated in the crystal in heated applications such when measuring nip width formed by a heated fuser roll.

Figure 5:
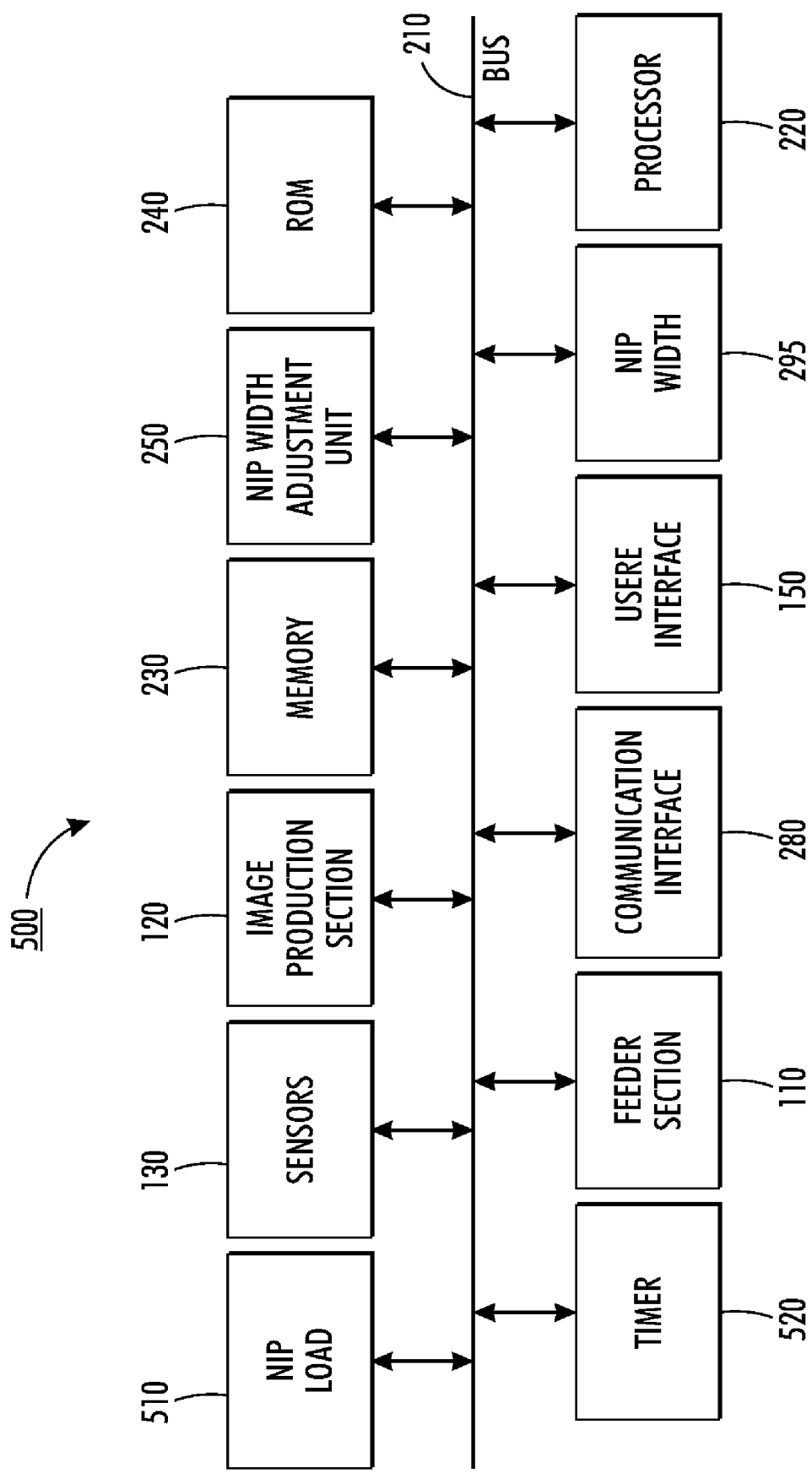
FIG. 5 is an exemplary block diagram of the image production device with NIP width determining circuitry in accordance with one possible embodiment of the disclosure.

FIG. 5 is an exemplary block diagram 500 of the image production device 100 with NIP width determining circuitry in accordance with one possible embodiment of the disclosure. The hardware in image production device 100 may include a bus 210, a processor 220, a memory 230, a read only memory (ROM) 240, a nip width adjustment unit 250, a feeder section 110, an input section or sensor 132, a user interface 150, a communication interface 280, an image production section 120, and a nip width determining unit 295. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. ROM 240 may store values for lookup table for calibrating the values from PZT crystal 406, values of the pressure or load experienced by the rolls, and other algorithms that may appropriate for determining dwell time or nip width. A storage device may augment the ROM and may include any type of storage media, such as, for example, magnetic or optical recording media and its corresponding drive.

The NIP Load 510 can be implemented with the circuitry discussed with reference to FIG. 4 or using appropriate program modules that process electrical signals from a load sensor such as PZT crystal 405 in the same manner as circuit 400. Timer 520 is a module in hardware or software that indicates the time between the compression and decompression of the PZT crystal at the start of the nip and at upon the end of the nip. The NIP width 295 is module for calculating the nip width based on data from timer 520 and nip load 510.

User interface 150 may include one or more conventional mechanisms that permit a user to input information to and interact with the image production unit 100, such as a keyboard, a display, a mouse, a pen, a voice recognition device, touchpad, buttons, etc., for example. An output section 130, shown in FIG. 1, may include one or more conventional mechanisms that output image production documents to the user, including output trays, output paths, finishing section, etc., for example. The image production section 120 may include an image printing and/or copying section, a scanner, a fuser, and the like, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIG. 1 with the hardware discussed in FIG. 5 are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

FIG. 6 illustrates a side view of an apparatus for dynamically adjusting nip width in accordance to an embodiment. The apparatus may be a document feeder, a printer, a scanner, a multifunction media device, a xerographic machine, or any other device that transports media. The apparatus can include a media transport (not shown) configured to transport media 612. The apparatus can also include a fuser member 620 coupled to the media transport, where the fuser member 620 can have a fuser nip 622 configured to fuse an image on media. The fuser member 620 can include a rotational fuser member 170 rotationally supported in the apparatus and a rotational pressure member 180 rotationally supported in the apparatus. A rotational member may be a roll, a belt, or any other member that can be rotationally supported in the apparatus. The rotational pressure member 180 can be configured to exert pressure against the rotational fuser member 170 at the fuser nip 622.

The apparatus can include an exit sensor 132 coupled in proximity to the fuser member 620, where the exit sensor 132 can be configured to sense an exit temperature of the print media sheet after the media exits the fuser nip 622. The exit sensor 132 can be a non-contact thermal sensor. The load/pressure sensors (183, 185) can also form part of sensor 132 and the signals from these sensors can be routed through communication channel 607 to be processed by a computer or the like. The apparatus can further include a controller 605 coupled to the exit sensor 132 and coupled to the fuser member 620, where the controller 605 can be configured to adjust fuser member settings, such as a fuser nip width 623, according to the sensed exit temperature or by determining deviation of the nip width calculated using PZT crystal 405 and a predetermined value for the print job. For example, the controller 605 can adjust fuser member nip settings, such as the nip width 623 or a nip temperature and can adjust other fuser member settings, such as fuser speed. The fuser nip 622 can be dynamically adjusted through a load system by any number of dynamic means, such as variable cams, air cylinders, or other dynamic means to compensate for variations of the nip width from a desired or expected nip width. Other variations such as the sheet temperature can increase as it passes through the fuser nip 622 due to nip width disturbance. One or more thermal sensors 132 can be used to measure the increase in temperature of the media sheet 612. The temperature change or increase can be used as a feedback mechanism to adjust fuser member settings.

The controller 605 can be configured to adjust fuser member settings by adjusting a fuser nip width 623 according to the sensed media sheet exit temperature, where the fuser nip width 623 is substantially parallel to the media sheet travel direction. The controller 605 can also be configured to adjust fuser member settings by adjusting at least one of a fuser member temperature and a fuser member rotational speed according to the sensed media sheet exit temperature.

One of the two members 170 and 180 can be hard and one can be soft or deformable. The fuser nip width 623 can be a function of the Durometer, such as the hardness or deformability, of the soft member. Unfortunately, the soft member may harden over time. For example, a soft roll can harden over time and the fuser nip 622 can accordingly get smaller as the roll hardens, which can reduce fusing efficiency. The apparatus can use the sensed exit temperature as feedback to adjust a spring or force 642 that generates pressure between the members 170 and 180 to maintain the appropriate fuser nip width 623 to appropriately fuse the image on the media sheet 612. For example, the apparatus can increase the force 642 between the members 170 and 180 if one of them gets harder. The apparatus can also decrease the force 642 applied to the fuser nip 622 to create a smaller fuser nip width 623 for media and job contents that do not require as much fusing. This can increase component life, such as fuser roll life.

Figure 7:
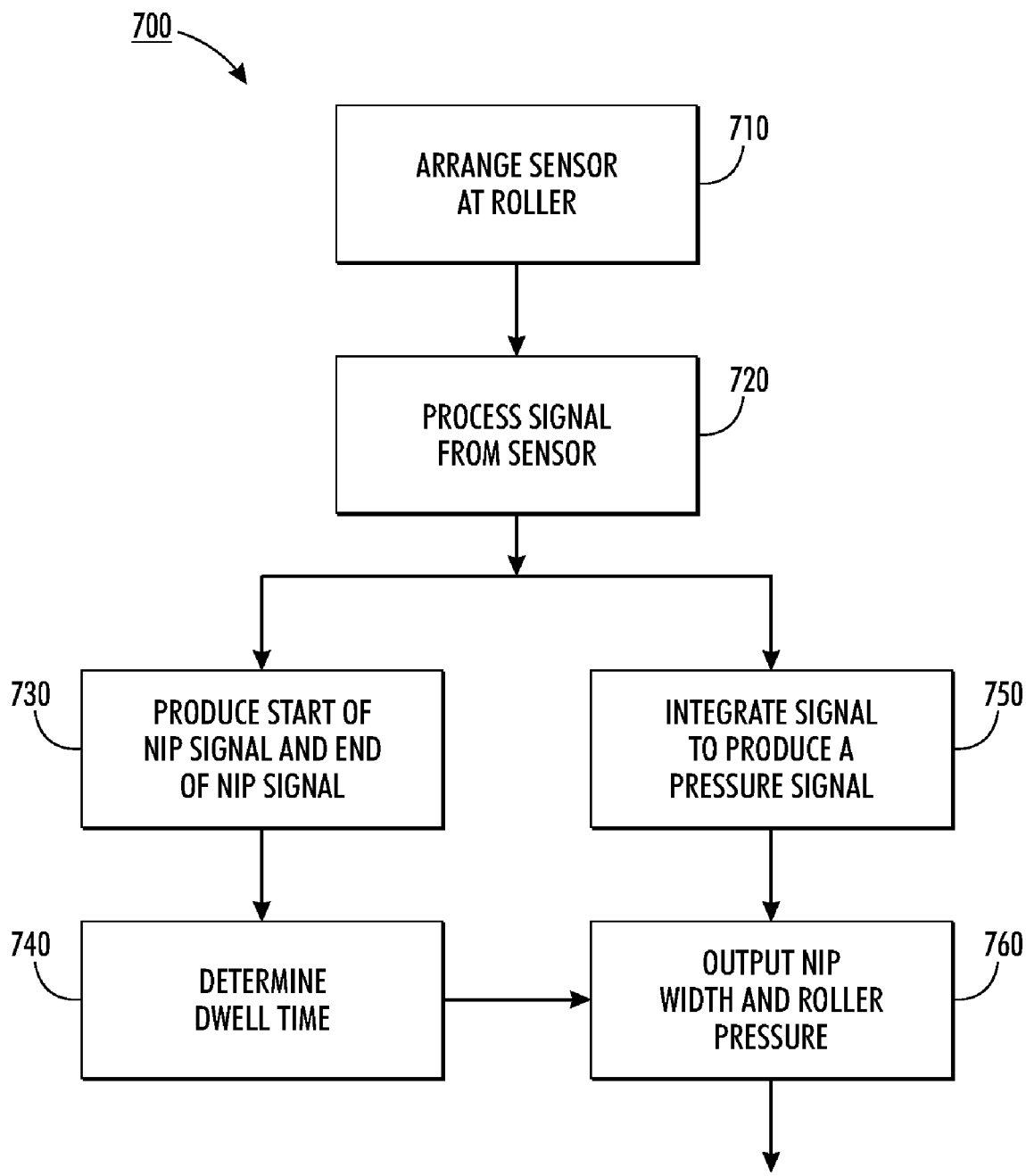
FIG. 7 is a flow chart of a method for processing PZT signals in accordance to an embodiment.

FIG. 7 is a flow chart of a method 700 for processing PZT signals in accordance to an embodiment. Method 700 begins with action 710 by arranging at least one sensor at one of the rotating rolls. The sensor should be embedded in a region outside the paper path like at the inboard and outboard ends of the roller so as to not mark the paper. In action 720, the signal produced from the at least one embedded sensor is processed in accordance to the description of circuit 400 described in FIG. 4. The roll compression signal is taken as the start of a clock cycle (timer) and the decompressed signal is the end of the clock cycle. The range or the difference between the end and start of the clock cycle value is indicative of the dwell time and nip width. Actions 730 and 740 show the steps to take in order to determine dwell time. In action 730, a signal indicative of the start of the nip and a signal indicative of the end of the nip is produced. In action, 740, from the produced signals a dwell time is determined. In action 750, the load signals from the at least one sensor are integrated. Note that the integration produces a value for the pressure during compression and a value for pressure during decompression. The value for the pressure during compression would be valid between the positive (compression) and negative (decompression) current pulses. In action 760, the nip width and roller pressure is output to be processed by controller, operator, or apparatus for dynamically adjusting nip width.

Generally, program modules include routine programs, objects, components, data structures, and the like that performs particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus to detect nip width defined between rotatable members in a printing system, the apparatus comprising:
   a first rotatable member having an axis of rotation and a surface;
   a second rotatable member having an axis of rotation that is substantially parallel to the axis of rotation of the first roller, the at least one second rotatable member disposed so that a surface of the second rotatable member exerts pressure on the surface of the first rotatable member at a nip having a width; and
   at least one sensor disposed at the end of the second rotatable member to generate an electrical signal upon the start of the nip and at upon the end of the nip, the sensor being sensitive to mechanical pressure associated with the nip,
   wherein the at least one sensor is selected from a group consisting of load cell, piezoelectric crystal and combination thereof and the electrical signal generated by the at least one sensor is passed to a circuit by at least one of a signal transmitter and a communication cable, the communication cable being a stationary contact with a spring loaded brush.

2. The apparatus in accordance to claim 1, wherein the communication cable is a cable coupled to a ring style connector.

3. The apparatus in accordance to claim 1, wherein the electrical signal from the at least one sensor is produced at the start of the nip and upon the end of the nip.

4. The apparatus in accordance to claim 3, the apparatus further comprising:
   a system to calculate a nip width at least partially based on a signal from the at least one sensor.

5. The apparatus in accordance to claim 1, the apparatus further comprising:
   a circuit to receive the electrical signal generated by the at least one sensor so as to produce timing pulses and a magnitude signal indicative of the exerted pressure on the surface of the first rotatable member.

6. A method to detect nip width defined between a first rotatable member having an axis of rotation and a surface and a second rotatable member having an axis of rotation that is substantially parallel to the axis of rotation of the first rotatable member in a printing system, the method comprising:
   arranging at least one sensor disposed at the end of the second rotatable member to generate an electrical signal upon the start of the nip and at upon the end of the nip, the at least one sensor being sensitive to mechanical pressure associated with the nip;
   processing with a circuit the electrical signal generated by the at least one sensor so as to produce timing pulses and a magnitude signal indicative of an exerted pressure caused by the second rotatable member on the surface of the first rotatable member; and
   determining at least one of nip width and dwell time from the timing pulses,
   wherein the at least one sensor is selected from a group consisting of load cell, piezoelectric crystal and combination thereof and the electrical signal generated by the at least one sensor is passed to a circuit by at least one of a signal transmitter and a communication cable, the communication cable being a stationary contact with a spring loaded brush.

7. The method in accordance to claim 6, wherein the communication cable is a cable coupled to a ring style connector.

8. The method in accordance to claim 6, wherein the electrical signal from the at least one sensor is produced at the start of the nip and upon the end of the nip.

9. The method in accordance to claim 6, wherein the circuit to receive the electrical signal generated by the at least one sensor comprises an inverting amplifier and integrator amplifier.

10. An apparatus comprising:
    a media transport configured to transport a media sheet;
    a fuser member coupled to the media transport, the fuser member having a fuser nip configured to fuse an image on media;
    at least one sensor disposed at the fuser member away from the media sheet to generate an electrical signal upon the start of the fuser nip and at upon the end of the fuser nip, the at least one sensor being sensitive to mechanical pressure associated with the nip;
    a circuit to receive the electrical signal generated by the at least one sensor so as to produce timing pulses and a magnitude signal indicative of an exerted pressure during the fuse of an image on media; and a controller coupled to the circuit to receive the electrical signal and coupled to the fuser member, the controller configured to adjust a fuser member nip width according to the timing pulses and the magnitude signal, wherein the at least one sensor is selected from a group consisting of load cell, piezoelectric crystal and combination thereof and the electrical signal generated by the at least one sensor is passed to a circuit by at least one of a signal transmitter and a communication cable, the communication cable being a stationary contact with a spring loaded brush.

11. The apparatus in accordance to claim 10, wherein the communication cable is a cable coupled to a ring style connector.

12. The apparatus in accordance to claim 10, wherein the electrical signal from the at least one sensor is produced at the start of the fuser member nip and upon the end of the fuser member nip.

13. The apparatus in accordance to claim 12, wherein the controller determines at least one of nip width and dwell time from the timing pulses.

14. The apparatus in accordance to claim 10, wherein the circuit to receive the electrical signal generated by the at least one sensor comprises an inverting amplifier and an integrator amplifier.

* * * * *